Aug. 6, 1940.    T. R. SMITH    2,210,267
FINGERNAIL TRIMMING MACHINE
Filed Sept. 22, 1939    4 Sheets-Sheet 1
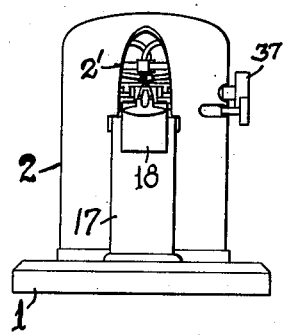
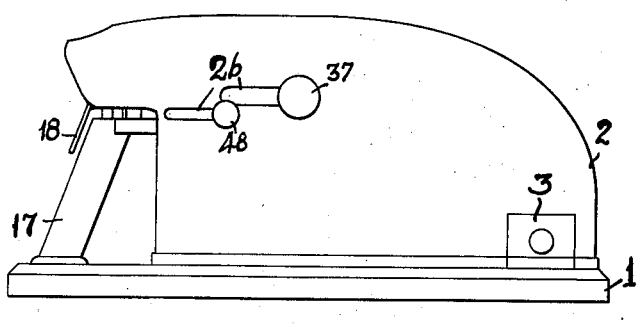
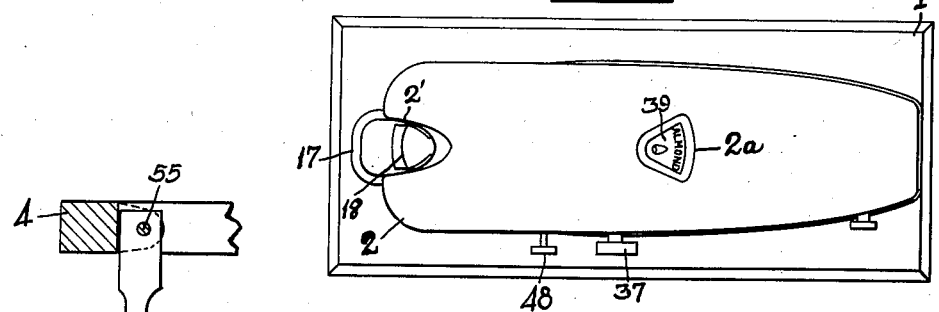
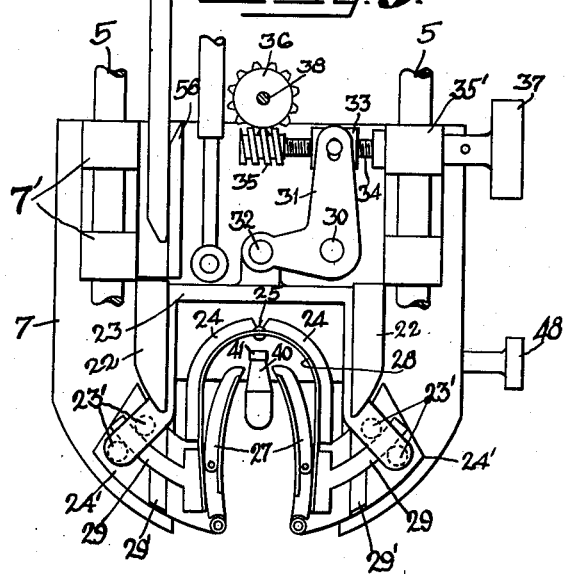
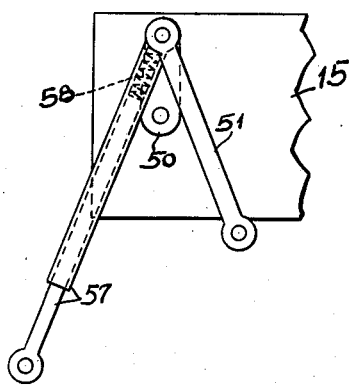
INVENTOR,
Thomas R. Smith
BY
J. E. Trabucco
ATTORNEY

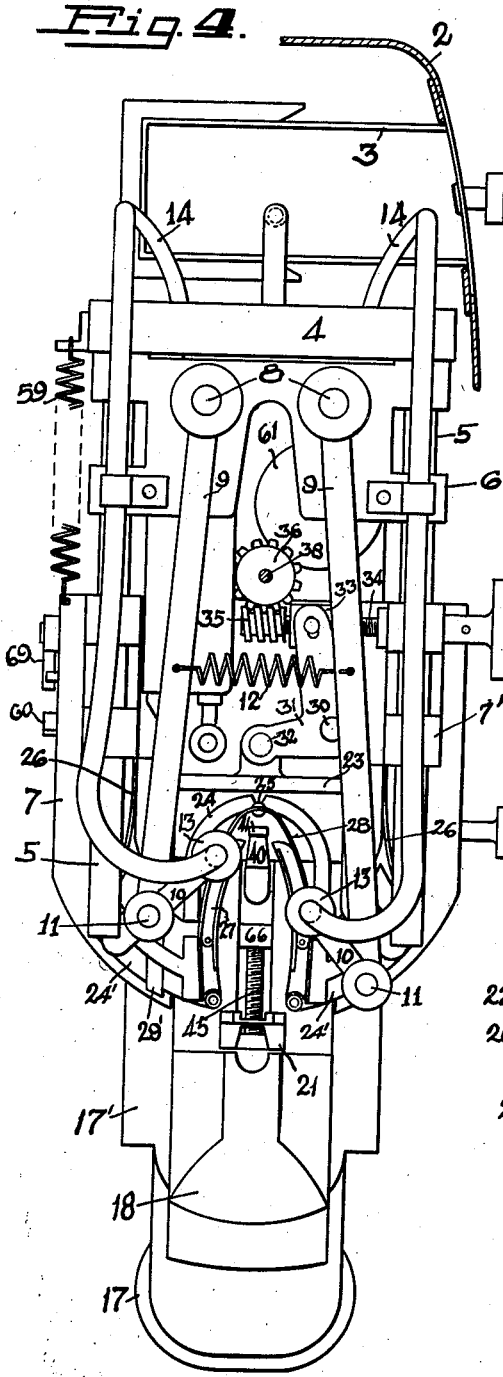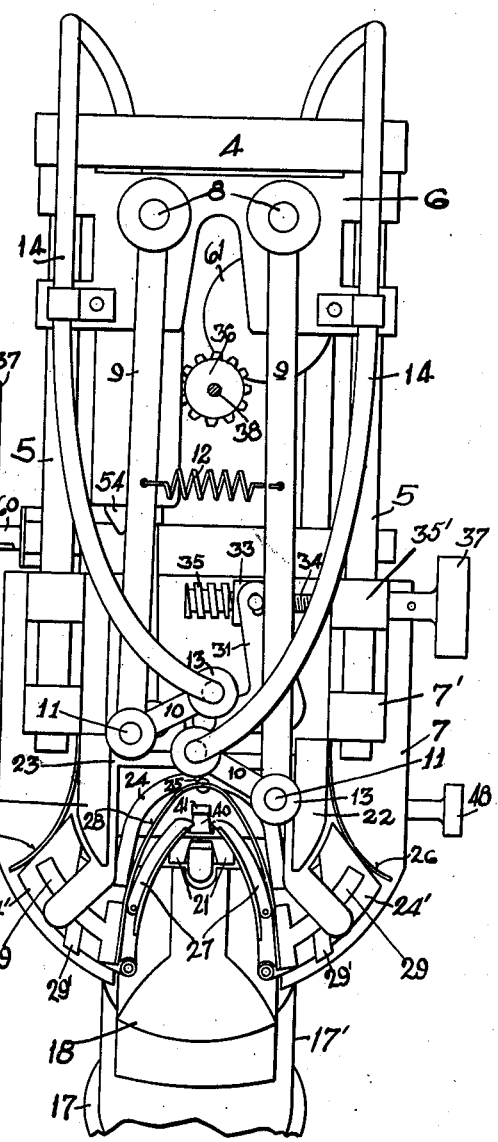

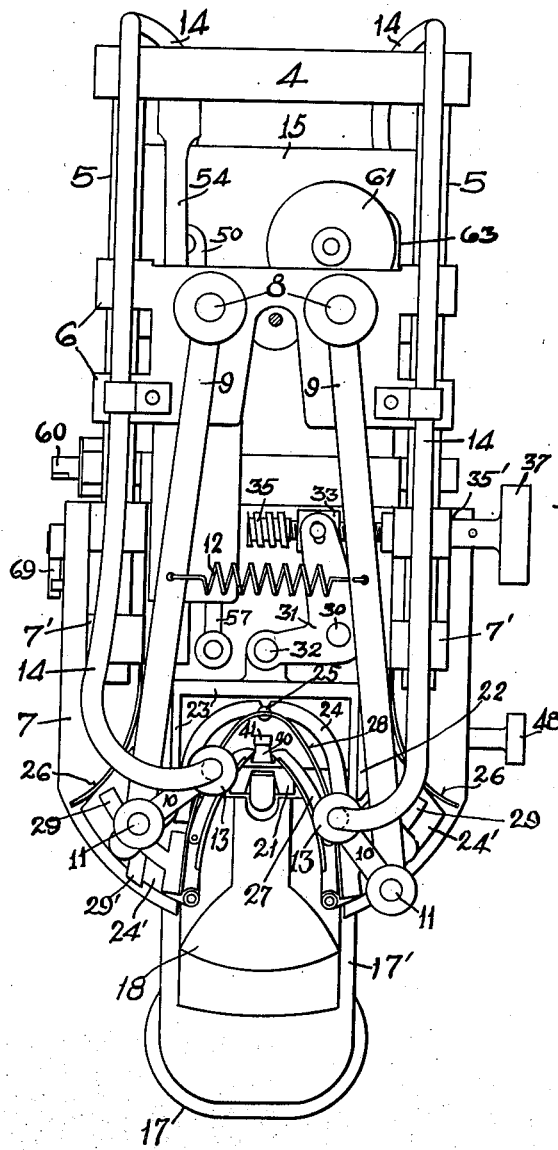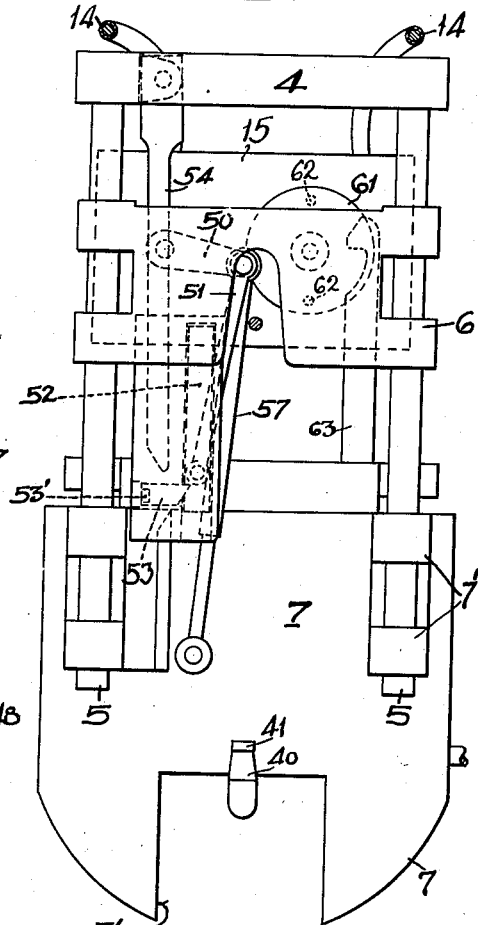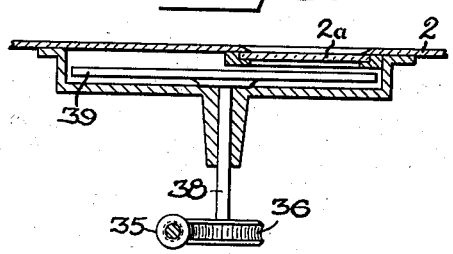

Aug. 6, 1940.    T. R. SMITH    2,210,267
FINGERNAIL TRIMMING MACHINE
Filed Sept. 22, 1939    4 Sheets-Sheet 4

INVENTOR,
Thomas R. Smith
BY
J.E. Nabucco
ATTORNEY

Patented Aug. 6, 1940

2,210,267

UNITED STATES PATENT OFFICE 2,210,267

FINGERNAIL TRIMMING MACHINE

Thomas R. Smith, San Francisco, Calif.

Application September 22, 1939, Serial No. 296,091

11 Claims. (Cl. 132—73.6)

This invention relates to improvements in fingernail trimming machines.

An object of my invention is to provide an improved electrically operated fingernail trimming machine which embodies novel means for automatically trimming a fingernail in accordance with a predetermined shape selected prior to the actual operation of the cutting mechanism.

Another object of my invention is to provide a fingernail trimming machine of the kind characterized, embodying adjustable cutter guide means which is capable of being adjusted in accordance with the particular shape it is desired that a person's fingernail is to assume, whereby a plurality of cutters may be guided during their automatic operation so as to trim the fingernail to the predetermined shape.

A further object of my invention is to provide a fingernail trimming machine of the kind characterized which embodies novel means for automatically conveying the fingernail cuttings resulting from a trimming operation to a receptacle.

Other and further objects of my invention will be pointed out hereinafter or will be indicated in the appended claims, or will be obvious to one skilled in the art upon an understanding of the present disclosure. For the purposes of this application I have elected to show herein certain forms and details of a fingernail trimming machine representative of my invention; it is to be understood, however, that the embodiments of my invention herein shown and described are for the purpose of illustration only, and that therefore it is not to be regarded as exhaustive of the variations of the invention, nor is it to be given an interpretation such as might have the effect of limiting the claims short of the true and most comprehensive scope of the invention in the art.

In the accompanying drawings:

Fig. 1 is a front elevation of a fingernail trimming machine embodying the preferred principles of my invention;

Fig. 2 is a side elevation of the machine;

Fig. 3 is a top plan view of the machine;

Fig. 4 is a top plan view of the machine with the enclosing casing removed, showing the relative positions of the various parts when the machine is not in operation;

Fig. 5 is a view similar to Fig. 4, showing the shaper plate in a forward position;

Fig. 6 is a view similar to Fig. 4, showing the cutter carrying plate in a fully advanced position;

Fig. 7 is a skeletonized top plan view of the shaper plate and the cutter carrying plate, showing the operating mechanism therefor;

Fig. 8 is a vertical sectional view taken through the selective means for showing the particular shape a person's fingernail is to assume after the cutting operation is completed;

Fig. 9 is a plan view of a fragmentary part of the machine, showing the cutter guide in a widened position;

Fig. 10 is a top plan view of a part of the operating mechanism for the shaper plate and the cutter carrying plate;

Figure 11:
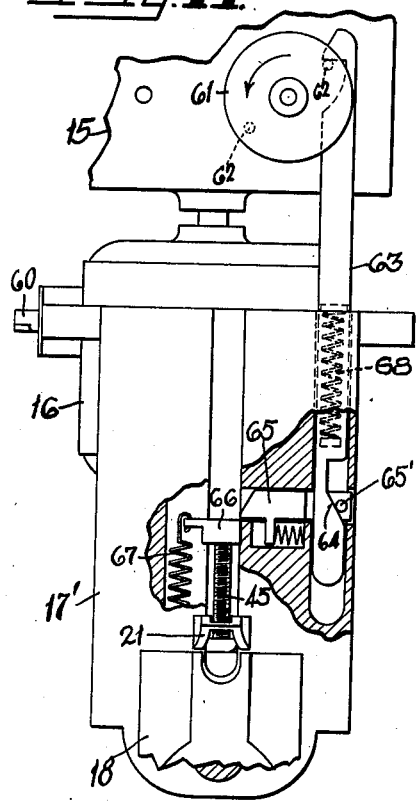
Fig. 11 is a top plan, partly in section, of a fragmentary part of the machine, showing the detailed construction of the shaper plate releasing mechanism.

Referring to the drawings, the numeral 1 designates a base on which is mounted an enclosing casing 2 having a finger receiving opening 2' in its front end, a window 2a in its top side and suitable slots 2b in one of its sides. Near the rear end of the casing, one of its sides is provided with a rectangular shaped opening into which a receptacle or drawer 3 is slidably positioned.

Mounted on the base 1 is a supporting frame 4 having forwardly disposed parallel extensions 5 which serve to slidably support a cutter carrier member 6 and also an underlying shaper plate 7, the latter being movably suspended from the said extensions by means of vertical lugs 7' which slidably embrace the said extensions.

Pivotally secured as at 8 to the carrier member 6 are forwardly disposed rods 9 which have inwardly disposed arms 10 pivotally secured to their forward ends as at 11. A spring 12 secured at its ends to the rods 9 tends to pull the forward ends of the latter toward each other. Although not shown on the drawings spring means is preferably associated with each of the arms 10 for urging their free ends inwardly and forwardly. The free ends of each of the arms rotatably carries a cutter 13 which is adapted to be rotated through a flexible shaft 14 operatively connected to a power take-off or transmission means 15 which is supplied with power by an electric motor 16. The cutters are mounted on vertical pivots and each is circular in horizontal cross-section, and each is serrated at its periphery to provide a cutting or filing edge whereby a person's fingernail may be trimmed.

Figure 13:
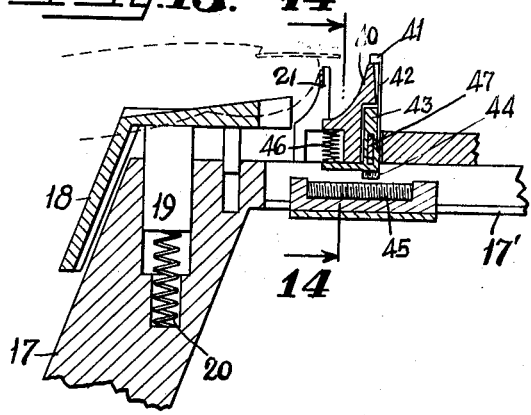
Fig. 13 is a vertical sectional view taken through the finger rest, showing the shaper plate locking mechanism in detail.

Secured to the base 1 is an upwardly disposed supporting column 17 which has a rearwardly extending longitudinally slotted flange 17' at its upper end. Mounted on the upper end of the supporting column 17 is a depressible finger rest 18, the upper part of which fits in a substantially rectangular shaped slot 5' in the front end of the shaper plate 7. The finger rest 18 as a depending projection 19 (see Fig. 13) which enters a hole in the supporting column 17 and engages with a spiral spring 20, the latter serving to yieldably urge the finger rest in an upward direction so as to facilitate the positioning of a person's finger in a suitable position, whereby the cutters may properly engage with the fingernail. Projecting upwardly from the slotted flange 17' of the supporting column 17 and positioned to the rear of the rear end of the finger rest 18 is a finger stop member 21 which is adapted to prevent the finger from being moved rearwardly beyond a position where it should normally be positioned.

Figure 12:
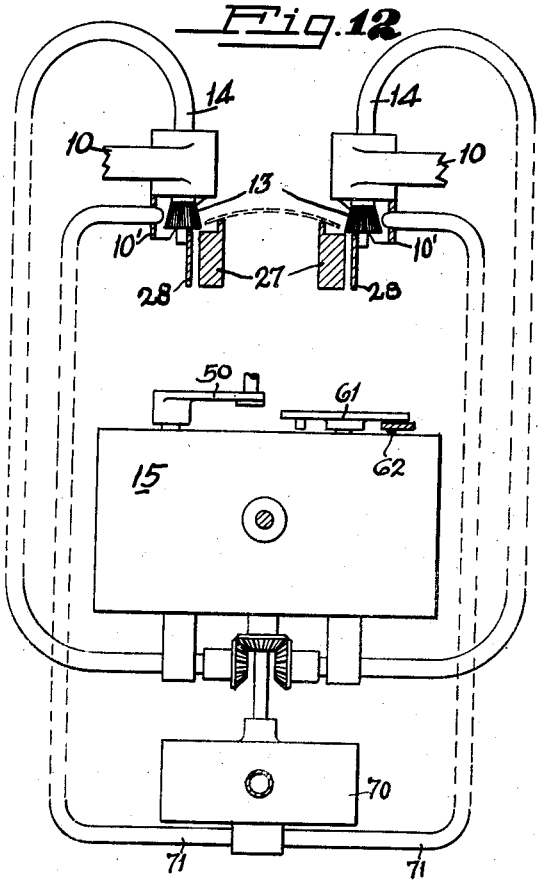
Fig. 12 is a schematic view showing the cutters, the operating mechanism therefor, and the means for picking up and conveying the fingernail particles resulting from the cutting operation to a receiver.

The shaper plate 7 carries at its forward end a pair of upstanding spaced guides 22 within which a frame 23 is adjustably positioned. Positioned within the frame 23 and supported by the shaper plate 7 are two semi-circular or arcuate shaped members 24, the rearwardly disposed ends of which engage with and move about a slotted pivot pin 25. The arcuate shaped members are provided at their forward separated ends with outwardly disposed enlarged parts 24' which rest on the shaper plate 7 and are adapted to slide outwardly thereon when a person's finger is inserted between them. Leaf springs 26 engaging with the enlarged parts 24' urge the forward ends of the said arcuate shaped members 24 inwardly or toward each other. Pivotally secured at their forward ends to the arcuate shaped members 24 are finger engaging members 27 which are positioned inside the arcuate shaped members and are provided at their upper inside edges with flanges for engaging with and over which a fingernail is adapted to extend during the trimming operation. Held at its forward ends in slidable contact with the forward ends of the arcuate shaped members 24 is a cutter guide element 28 which is positioned between the said arcuate shaped members and the finger engaging members 27. The cutter guide element is held at its rear end in a fixed position by the slotted pivot pin 25 and it is made preferably of resilient spring steel and is adapted to change its shape in accordance with the outward movement of the forward ends of the arcuate shaped members 24 and also when the frame 23 is adjusted backwardly or forwardly, as will be later described. Each of the cutters 13 is partly enclosed by a shield 10' (see Fig. 12) which is carried by an arm 10 and engages with the cutter guide element 28. The shields and the cutter guide element serve as cooperating means for controlling the positions of the cutters with respect to a fingernail which is placed inside the device. The shields serve the purpose of preventing the cuttings from the fingernail from being thrown therebeyond during the cutting operation, and they also facilitate the picking up and removal thereof as will be later described.

The forward ends of the frame 23 are flared outwardly and each end thereof is provided with underlying spaced roller guides 23' (see Fig. 9). Projecting outwardly between the roller guides 23' are arcuate shaped bars 29 which are secured to the forward ends of the arcuate shaped cutter guide element 28. The arcuate bars 29 have secured to them depending longitudinally disposed flanges 29' which slide within suitable grooves provided in the enlarged parts 24' of the arcuate shaped members 24. The engagement of the flanges 29' with the slots of the enlarged parts 24' permit the straight forward and backward movement of the bars 29 when the frame 23 is so actuated, as will be later described. The forward movement of the frame 23 will cause the forward ends of the cutter guide element 28 to be actuated forwardly, thereby narrowing the same or bringing its opposite sides closer together, and when the said frame is moved in the opposite direction, the said cutter guide element is made to assume a wider shape with its rear end more rounded than before.

The frame 23 is moved forwardly or rearwardly by the following described mechanism: Pivotally secured to the shaper plate 7 as at 30 is a bell crank 31, having one of its ends pivotally secured as at 32 to the rear end of the frame and its opposite end slidably and pivotally secured to a tubular internally threaded nut 33. Screwably extending through and engaging with the nut 33 is a screw shaft 34 having its inwardly disposed end provided with a worm gear 35 which meshes with a circular gear 36. The screw shaft 34 is journalled as at 35' and its outwardly disposed end extends through one of the slots 2b in the casing and is provided with a finger piece 37. By turning the finger piece 37 the bell crank 31 may be actuated about its pivot 30 to move the frame 23 either backwardly or forwardly. Secured axially to the circular gear 36 is an upwardly disposed shaft 38 which is secured at its upper end to a horizontally disposed rotatable disc 39, the said disc underlying the window 2a in the upper side of the casing. On the upper surface of the disc 39 are displayed a series of figures and names which are intended to indicate the various shapes a person's fingernail may assume after the trimming operation is completed. The operation of the means for changing the shape of the cutter guide element 28 is synchronized with respect to the operation of the disc 39, thereby permitting a certain fingernail figure and its descriptive name to appear behind the window 2a in accordance with the particular shape the cutter guide element 28 is made to assume. Thus before or after a person's fingernail is properly positioned between the finger engaging members 27, the finger piece 37 is adjusted to cause the cutter guide element 28 to assume a suitable shape. The particular shape the cutter guide element assumes after its adjustment is shown by the particular name and figure appearing through the window 2a.

Figure 14:
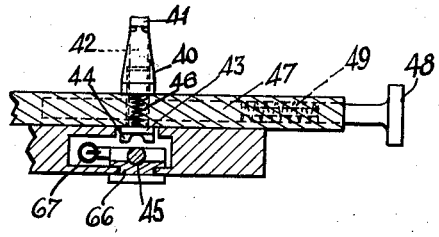
Fig. 14 is a sectional view taken on the line 14—14 of Fig. 13.

The shaper plate 7, after the cutter guide element 28 has been adjusted to a suitable shape, is locked in a fixed position by the following described mechanism: Positioned between the rear ends of the finger engaging members 27 is an upright projection 40 secured to the shaper plate 7 (see Figs. 13 and 14), the said upright projection being adapted to fit against the stop member 21 when the said shaper plate is positioned in its extreme forward position, as shown in Figs. 5 and 6. With its upper enlarged end 41 normally overlying the upper end of the projection 40, is a spring 42 which is secured to a block 43. The block 43 and the spring 42 are capable of being actuated upwardly and downwardly within a slot provided in the shaper plate 7. Secured to the underneath side of the block 43 is a serrated or threaded depending protuberance 44 which is adapted to engage with a fixed serrated or threaded bar 45 secured to a slidable flange 66 supported by the flange 17' of the supporting column 17. A spiral spring 46 engaging with the block 43 urges the same downwardly. When a person's fingernail is pushed rearwardly into engagement with the enlarged end 41 of the spring 42, the said enlarged end is released from engagement with the projection 40, thereby permitting the spiral spring 46 to actuate the block and its serrated protuberance 44 downwardly, whereby the latter may engage with the serrated bar 45 and thereby lock the shaper plate in a fixed position. The serrated protuberance 44 is released from the serrated bar 45 by means of a slidable bar 47 which, when pressed inwardly by a finger piece 48, forces the block 40 upwardly. When the block 40 and the spring 42 are actuated in an upward direction, the enlarged upper end 41 of the said spring automatically moves forwardly to a position where it again engages with the upper end of the projection 40, thereby maintaining the locking mechanism in a position whereby the shaper plate 7 and the various elements it carries are free to slide backwardly. A spiral spring 49 yieldably maintains the bar 47 in a position whereby the block 43 is again free to drop downwardly.

The shaper plate 7 and the cutter carrying member 6 are reciprocated by the following described mechanism: Operatively connected to and projecting upwardly from the power take-off 15 is a crank 50 which is operatively connected by a connecting rod 51 to a piston 52. The piston 52 is slidably mounted in a longitudinal channel provided in the current carrying member 6, and a transversely disposed spring pressed latch 53 carried also by the said cutter carrying member normally engages with a notch in the side of said piston for a predetermined part of the cycle and constitutes a clutch mechanism whereby the cutter carrying member may be actuated in a forward direction during a part of the rotation of the crank 50 (see Fig. 7). A bar 54 pivoted as at 55 to the frame 4 is positioned so its outer edge may engage a projection 53' on the latch 53 when the said bar is actuated outwardly by a cam member 56 carried by the shaper plate 7. (See Fig. 9.) The crank 50 is connected by a telescopically arranged connecting rod 57 to the shaper plate 7. A spring 58 in the tubular part of the connecting rod 57 enables an actuating forward pressure to be applied to the shaper plate 7 when the crank is rotated a part of the revolution.

When the crank is rotated, the shaper plate 7 is actuated forwardly against the tension of a spring 59 by means of a telescopic connecting rod 57, during which time the cam 56 on said plate engages with the bar 54 and holds the latch 53 outwardly so the latter cannot engage with the notch in the side of the piston 52. The latter is thereby permitted to move in its channel without causing the cutter carrying member 6 to be moved forwardly. As the shaper plate reaches the forward end of its stroke the cam 56 thereon disengages the bar 54 and the spring pressed latch 53 automatically moves inwardly so it may engage with the notch in the piston 52. When the shaper plate reaches the forward end of its stroke, the locking mechanism is automatically operated and locked, this result being accomplished upon a person's fingernail engaging and releasing the enlarged upper end 41 of the spring 42. The continued rotation of the crank 50 brings the piston 52 into engagement with latch 53, thereby permitting the crank to actuate the cutter carrying member 6 in a forward direction. The second revolution of the crank causes the cutter carrying member 6 to be actuated through its forward stroke, and during this period the shaper plate is held in a stationary forwardly disposed position. The forward movement of the cutter carrying member 6 carries the rotating cutters 13 into engagement with the person's fingernail and the latter is thereupon trimmed. The actual operation of the device is started through the manual operation of an electric switch 60 located on the side of the frame 4.

Connected to the power take-off 15 is a rotatable disc 61 having oppositely disposed depending pins 62 extending therefrom, the latter being adapted to successively engage with the notched rear end of a longitudinally disposed bar 63. The disc 61 is rotated at approximately one-quarter the speed of the crank 50. The forward end of the bar 63 is provided with a cam surface 64 near its forward end (see Fig. 11), and the said surface is in engagement with a projection 65' on a latch member 65 which is urged inwardly by a spring into engagement with a longitudinally slidable lug 66 secured to the serrated shaft 45. The lug 66 slides back and forth in the longitudinal slot provided in the flange 17' of the supporting column 17, and it is urged forwardly by a spring 67. A spiral spring 68 is adapted to actuate the bar 63 in a forward direction after it has been moved by the rotating disc in a rearward direction. When the disc 61 is rotated in a counterclockwise direction, the projecting pins 62 thereof successively engage with the notched end of the bar 63 and pull the latter rearwardly, thereby causing the cam surface 63' to engage with the projection 65' and force the latch member 65 outwardly so the lug 66 and its serrated shaft 45 are free to be actuated rearwardly with the shaper plate 7 against the tension of the spring 67. The shaper plate will be actuated rearwardly during the continued rotation of the crank 50, and the automatic release of the latch 65 from the slidable lug 66 will permit the shaper plate to be so moved. After the shaper plate has been moved to its extreme rearward position, thus completing its cycle, the finger piece 48 may be pushed inwardly to effect the release of the serrated member 44 from the serrated shaft 45, thereby permitting the latter to be actuated in a forward direction by the then distended spring 67 to its normal position. It will be noted that the operation of the disc 61 and its associated lug releasing mechanism which it is adapted to actuate is so timed with respect to the operation of the crank 50 that the shaper plate is released and capable of being actuated rearwardly along with the cutter carrying member 6 just after the said cutter carrying member has completed its forward stroke. The shaper plate 7 when released from its forwardly locked position is automatically moved to its rearwardly disposed inactive position by the then distended spring 59. Secured to the shaper plate 7 is a pivoted member 69 (see Figs. 4 and 6) which, when the shaper plate moves rearwardly, is adapted to engage with and actuate the switch 60 to a position whereby the flow of electricity to the motor is discontinued. The pivoted member 69 is capable of moving about its pivot without affecting the switch when the shaper plate 7 is moved in a forward direction.

A suction blower 70 operatively connected to the power take-off 15 is connected by tubular conduits 71 to the inside of the shields 10'. The cuttings or filings from the fingernail being trimmed are drawn through the tubular conduits 71 and deposited in the drawer or receptacle 3.

Having described my invention, what I claim is:

1. A fingernail trimming machine comprising a cutter guide having a finger receiving opening, means for adjustably changing the shape of the cutter guide, a plurality of rotatable cutters having means associated therewith for slidably engaging with the guide, means for changing the shape of the guide, and means for operating the cutters.

2. A fingernail trimming machine comprising a plurality of cutters, means for operating the cutters, reciprocatory cutter guide means for receiving the end of a person's finger, means actuated by a person's finger when it is inserted in the cutter guide means for locking the cutter guide means, and means for moving the cutters into engagement with a person's fingernail positioned in the cutter guide means.

3. A fingernail trimming machine comprising a cutter guide having a finger receiving opening, rotatable cutter means having abutment means engaging with the cutter guide, means for moving the cutter means about the guide, whereby a person's fingernail positioned inside the guide and in engagement with the cutter means may be trimmed, and means for rotating the cutter means.

4. A fingernail trimming machine comprising a finger rest, a cutter guide positioned at one end of the finger rest having a finger receiving opening, rotatable cutter means having abutment means engaging with the cutter guide, means for moving the cutter means about the guide, whereby a person's fingernail positioned inside the guide and in engagement with the cutter means may be trimmed, and means for rotating the cutter means.

5. A fingernail trimming machine comprising a movable cutter guide of general horseshoe shape having an opening in its front side, a stationary finger rest member adapted to extend into the front opening of the cutter guide, rotatable cutter means having abutment means movably engaging with the cutter guide, means for moving the cutter means about the cutter guide, whereby the nail of a person's finger positioned on the finger rest and inside the cutter guide may be trimmed, means for rotating the cutter means, and means for bringing the cutter guide into locked relation with the finger rest.

6. A fingernail trimming machine comprising a movable cutter guide of general horseshoe shape having an opening in its front side, a stationary finger rest member adapted to extend into the front opening of the cutter guide, rotatable cutter means having abutment means movably engaging with the cutter guide, means for moving the cutter means about the guide, whereby a nail of a person's finger positioned on the finger rest and located inside the cutter guide may be trimmed, means for rotating the cutter means, means for bringing the cutter guide into locked engagement with the finger rest, and means for adjusting the shape of the cutter guide to cause the cutter means to assume a certain fixed path of travel during operation thereof, whereby the shape of a trimmed fingernail may be predetermined.

7. A fingernail trimming machine comprising a movable cutter guide of general horseshoe shape having an opening in its front side, a stationary finger rest member adapted to extend into the front opening of the cutter guide, rotatable cutter means having abutment means movably engaging with the cutter guide, whereby the cutter means may be guided about a fixed path, means for moving the cutter means about the cutter guide, means for rotating the cutter means, and means for changing the shape of the cutter guide.

8. A fingernail trimming machine, comprising a stationary finger rest, a horseshoe shaped cutter guide mounted for forward and backward reciprocatory movement and adapted to receive a person's finger positioned on the finger rest, locking means for securing the cutter guide in fixed relation to the finger rest, cutter means mounted for forward and backward reciprocatory motion, having abutment means engageable with the cutter guide means, means for operating the cutter means, and synchronized means for first moving the cutter guide forwardly to its operative position and then the cutter means forwardly and in a path controlled by the guide.

9. In a fingernail trimming machine, a finger rest, cutter means for trimming the nail of a person's finger positioned on the finger rest, guide means positioned in spaced relation to the edges of the finger nail for guiding the cutter means in a fixed path, and means for actuating the cutter means about the guide means.

10. In a fingernail trimming machine, a finger receiving member, cutter means for trimming the nail of a person's finger which is positioned in the receiving member, guide means positioned in spaced relation to the edges of the fingernail for guiding the cutter means in a fixed path, means for fixing the particular shape of the guide means in accordance with the shape the fingernail is to assume after being trimmed by the cutter means, and means for actuating the cutter means about the guide means.

11. In a fingernail trimming machine, a finger receiving member mounted for reciprocatory motion, cutter means mounted for movement about a predetermined path, cutter guide means connected to the finger receiving member having the general shape of the end of a fingernail, means in the cutter guide means for maintaining a person's finger in a fixed position with its fingernail in a predetermined position with respect to the cutter guide means, and means for actuating the cutter means about the guide means.

THOMAS R. SMITH.